(12) United States Patent
Sako

(10) Patent No.: US 10,162,580 B2
(45) Date of Patent: Dec. 25, 2018

(54) IMAGE PROCESSING APPARATUS, IMAGE PROCESSING APPARATUS CONTROL METHOD, AND STORAGE MEDIUM

(71) Applicant: CANON KABUSHIKI KAISHA, Tokyo (JP)

(72) Inventor: Ritsuto Sako, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/679,283

(22) Filed: Aug. 17, 2017

(65) Prior Publication Data

US 2018/0024797 A1  Jan. 25, 2018

Related U.S. Application Data

(63) Continuation of application No. 14/927,741, filed on Oct. 30, 2015, which is a continuation of application No. 13/912,466, filed on Jun. 7, 2013, now Pat. No. 9,208,410.

(30) Foreign Application Priority Data

Jul. 4, 2012 (JP) .................................. 2012-150193

(51) Int. Cl.
*G06F 3/12* (2006.01)
*G06K 15/00* (2006.01)

(52) U.S. Cl.
CPC .......... *G06F 3/1229* (2013.01); *G06F 3/1205* (2013.01); *G06F 3/1254* (2013.01); *G06F 3/1255* (2013.01); *G06K 15/007* (2013.01)

(58) Field of Classification Search
None
See application file for complete search history.

(56) References Cited

U.S. PATENT DOCUMENTS

| | | | |
|---|---|---|---|
| 7,958,551 B2* | 6/2011 | Hibino | H04L 63/20 709/230 |
| 8,508,802 B2* | 8/2013 | Igarashi | G06F 3/1219 358/1.13 |
| 8,510,484 B2* | 8/2013 | Naito | H04L 65/4076 710/59 |

(Continued)

FOREIGN PATENT DOCUMENTS

| | | | |
|---|---|---|---|
| JP | 2011098661 A | 5/2011 | |
| JP | 2011215780 A | 10/2011 | |

(Continued)

OTHER PUBLICATIONS

Japanese Office Action issued in corresponding Japanese Application No. 2016-237747 dated Oct. 31, 2017.

*Primary Examiner* — Ted Barnes
(74) *Attorney, Agent, or Firm* — Venable LLP

(57) ABSTRACT

An image processing apparatus wirelessly communicates with an information processing apparatus without passing through an access point, provides a print service in which predetermined printing is performed in response to a print request from the information processing apparatus via a wireless communication unit, and enables a setting that is used for providing the print service if the setting is disabled when the information processing apparatus establishes communication with the image processing apparatus via the wireless communication unit.

14 Claims, 13 Drawing Sheets

(56) References Cited

U.S. PATENT DOCUMENTS

| | | | | |
|---|---|---|---|---|
| 8,699,475 B2* | 4/2014 | Nakajima | | H04W 8/265 370/338 |
| 8,705,763 B2* | 4/2014 | Kimura | | G11B 27/00 381/123 |
| 8,774,376 B2* | 7/2014 | Kojima | | H04W 76/22 379/100.01 |
| 8,924,509 B2* | 12/2014 | Schmidt | | H04L 12/2809 709/201 |
| 8,973,078 B2* | 3/2015 | Nagara | | H04N 5/44513 725/131 |
| 9,219,829 B2* | 12/2015 | McCauley | | H04N 1/00137 |
| 9,521,277 B1* | 12/2016 | Johnson | | H04N 1/00315 |
| 2002/0054119 A1* | 5/2002 | Dow | | H04N 1/00127 715/772 |
| 2003/0092395 A1* | 5/2003 | Gassho | | H04B 1/3816 455/68 |
| 2005/0044479 A1* | 2/2005 | Willams | | G06F 3/1222 715/273 |
| 2005/0128968 A1* | 6/2005 | Yang | | H04W 48/16 370/312 |
| 2005/0133602 A1* | 6/2005 | Stadelmann | | G06K 7/10712 235/469 |
| 2005/0146744 A1* | 7/2005 | McAllister | | H04N 1/00244 358/1.15 |
| 2005/0157329 A1* | 7/2005 | Park | | G06F 3/1236 358/1.15 |
| 2005/0198221 A1* | 9/2005 | Manchester | | H04L 41/0213 709/220 |
| 2006/0039336 A1* | 2/2006 | Ishimura | | H04L 9/0841 370/338 |
| 2006/0069807 A1* | 3/2006 | Tagawa | | H04L 29/12009 709/245 |
| 2006/0128360 A1* | 6/2006 | Hibino | | H04L 63/104 455/411 |
| 2006/0200564 A1* | 9/2006 | Watanabe | | G06F 3/1212 709/227 |
| 2006/0206592 A1* | 9/2006 | Fujii | | H04W 48/16 709/220 |
| 2006/0246941 A1* | 11/2006 | Watanabe | | H04W 48/16 455/552.1 |
| 2006/0246946 A1* | 11/2006 | Moritomo | | H04W 76/10 455/557 |
| 2006/0282541 A1* | 12/2006 | Hiroki | | G06Q 20/3674 709/228 |
| 2007/0030516 A1* | 2/2007 | Tsuji | | G06F 3/1204 358/1.15 |
| 2007/0073914 A1* | 3/2007 | Yoshida | | H04W 84/18 710/10 |
| 2007/0130296 A1* | 6/2007 | Kim | | H04W 76/11 709/220 |
| 2007/0134040 A1* | 6/2007 | Kurata | | B41J 2/17546 400/62 |
| 2007/0189322 A1* | 8/2007 | Hirose | | H04W 8/245 370/447 |
| 2007/0197238 A1* | 8/2007 | Nakajima | | H04W 8/265 455/466 |
| 2007/0223670 A1* | 9/2007 | Ido | | H04N 1/00278 379/201.01 |
| 2007/0268507 A1* | 11/2007 | Kim | | G06F 3/1206 358/1.13 |
| 2008/0045138 A1* | 2/2008 | Milic-Frayling | | H04N 1/00244 455/3.04 |
| 2008/0055632 A1* | 3/2008 | Oshiumi | | H04N 1/00204 358/1.15 |
| 2008/0207129 A1* | 8/2008 | Page | | H04W 8/005 455/41.3 |
| 2008/0270516 A1* | 10/2008 | Ragnet | | G06F 17/30011 709/202 |
| 2008/0304101 A1* | 12/2008 | Sasase | | G06F 3/1204 358/1.15 |
| 2009/0046686 A1* | 2/2009 | Izaki | | H04W 8/20 370/338 |
| 2009/0059278 A1* | 3/2009 | Fukunishi | | G06F 21/608 358/1.15 |
| 2009/0059279 A1* | 3/2009 | Sakurai | | G06F 3/1205 358/1.15 |
| 2009/0066998 A1* | 3/2009 | Kato | | G01C 21/26 358/1.15 |
| 2009/0161156 A1* | 6/2009 | Morita | | G06F 3/1204 358/1.15 |
| 2009/0244607 A1* | 10/2009 | Sako | | H04L 41/06 358/1.15 |
| 2010/0027414 A1* | 2/2010 | Hamachi | | H04W 48/16 370/216 |
| 2010/0034120 A1* | 2/2010 | Nakajima | | H04W 48/08 370/255 |
| 2010/0177894 A1* | 7/2010 | Yasuma | | H04L 63/0428 380/255 |
| 2010/0182638 A1* | 7/2010 | Kimura | | G06F 3/1204 358/1.15 |
| 2010/0182956 A1* | 7/2010 | Moritomo | | H04W 76/10 370/328 |
| 2010/0195589 A1* | 8/2010 | Moritomo | | H04L 12/66 370/329 |
| 2010/0211785 A1* | 8/2010 | Park | | H04L 29/1232 713/168 |
| 2010/0283586 A1* | 11/2010 | Ikeda | | H04N 1/00007 340/10.42 |
| 2011/0007901 A1* | 1/2011 | Ikeda | | H04B 5/02 380/270 |
| 2011/0010760 A1* | 1/2011 | Goto | | H04L 63/1441 726/4 |
| 2011/0082932 A1* | 4/2011 | Goto | | H04W 28/18 709/224 |
| 2011/0096354 A1* | 4/2011 | Liu | | G06F 3/1204 358/1.15 |
| 2011/0143789 A1* | 6/2011 | Watanabe | | G06F 3/1212 455/500 |
| 2011/0182204 A1* | 7/2011 | Goto | | H04W 28/18 370/252 |
| 2011/0261389 A1* | 10/2011 | Ohara | | H04M 11/007 358/1.15 |
| 2011/0292445 A1* | 12/2011 | Kato | | G06F 3/1222 358/1.15 |
| 2011/0302642 A1* | 12/2011 | Tanaka | | G06F 21/606 726/7 |
| 2011/0317680 A1* | 12/2011 | Goto | | H04W 24/02 370/338 |
| 2012/0019867 A1* | 1/2012 | Prati | | G06F 3/1204 358/1.15 |
| 2012/0038948 A1* | 2/2012 | Park | | G06F 3/1204 358/1.15 |
| 2012/0075664 A1* | 3/2012 | Nichols | | G06F 3/1204 358/1.15 |
| 2012/0081556 A1* | 4/2012 | Hwang | | H04N 1/00411 348/207.1 |
| 2012/0081745 A1* | 4/2012 | Asai | | G06F 3/1204 358/1.15 |
| 2012/0106396 A1* | 5/2012 | Sakai | | H04W 28/18 370/254 |
| 2012/0106496 A1* | 5/2012 | Sakai | | H04W 28/18 370/329 |
| 2012/0110065 A1* | 5/2012 | Oshima | | G06F 3/1204 709/203 |
| 2012/0120858 A1* | 5/2012 | Das | | H04W 52/0229 370/311 |
| 2012/0133971 A1* | 5/2012 | Park | | G03G 15/5004 358/1.15 |
| 2012/0133983 A1* | 5/2012 | Kojima | | H04W 76/22 358/1.15 |
| 2012/0140285 A1* | 6/2012 | Kamath | | G06F 3/1204 358/1.15 |
| 2012/0151400 A1* | 6/2012 | Hong | | G06F 3/04817 715/769 |
| 2012/0297040 A1* | 11/2012 | Amano | | G08C 17/02 709/223 |

(56) References Cited

U.S. PATENT DOCUMENTS

| | | | | |
|---|---|---|---|---|
| 2012/0307287 | A1* | 12/2012 | Motosugi | G06K 15/00 358/1.14 |
| 2012/0320414 | A1* | 12/2012 | Shibata | H04W 8/005 358/1.15 |
| 2013/0100486 | A1* | 4/2013 | Mccoog | G06F 3/1204 358/1.15 |
| 2013/0137414 | A1* | 5/2013 | Matsuda | H04W 8/005 455/418 |
| 2013/0141756 | A1* | 6/2013 | Miller | G06F 3/1204 358/1.15 |
| 2013/0148149 | A1* | 6/2013 | Park | G06F 3/1296 358/1.13 |
| 2013/0222292 | A1* | 8/2013 | Wang | G06F 3/041 345/173 |
| 2013/0222618 | A1* | 8/2013 | Chang | H04L 12/2805 348/207.2 |
| 2013/0278965 | A1* | 10/2013 | Uno | H04N 1/00095 358/1.15 |
| 2013/0301081 | A1* | 11/2013 | Moritomo | H04W 76/10 358/1.15 |
| 2014/0002851 | A1* | 1/2014 | Smith | G06F 3/1204 358/1.15 |
| 2014/0129134 | A1* | 5/2014 | Geelen | G01C 21/3641 701/409 |
| 2014/0189824 | A1* | 7/2014 | Nakajima | H04W 8/265 726/5 |
| 2014/0240781 | A1* | 8/2014 | Okigami | H04M 1/7253 358/1.15 |
| 2014/0320925 | A1* | 10/2014 | Shibata | H04W 8/005 358/1.15 |

FOREIGN PATENT DOCUMENTS

| | | |
|---|---|---|
| JP | 2011249960 A | 12/2011 |
| JP | 2011255517 A | 12/2011 |

* cited by examiner

FIG. 6

| Attribute | Data |
|---|---|
| Message Type | Data indicating message type |
| Serial Number | Data indicating serial number |
| Model Name | Data indicating model name such as AbcSmartPhone |
| OS Version | Data indicating OS version such as AbcOS1.0 |
| : | : |

601 — Attribute
602 — Data

FIG. 9

| Description | Type | Length | Value |
|---|---|---|---|
| Use mDNS | 0x1001 | 1bytes | 0x00 : Do not use<br>0x01 : Use |
| Use IPP-Print | 0x1002 | 1bytes | 0x00 : Do not use<br>0x01 : Use |
| Use IPP-Fax | 0x1003 | 1bytes | 0x00 : Do not use<br>0x01 : Use |

901 902 903 904

IMAGE PROCESSING APPARATUS, IMAGE PROCESSING APPARATUS CONTROL METHOD, AND STORAGE MEDIUM

CROSS-REFERENCE TO RELATED APPLICATIONS

This application is a continuation of U.S. patent application Ser. No. 14/927,741, filed on Oct. 30, 2015, which itself is a continuation of U.S. patent application Ser. No. 13/912,466, filed on Jun. 7, 2013, which is now U.S. Pat. No. 9,208,410, both of which are herein incorporated by reference.

FIELD OF THE INVENTION

The present invention relates to an image processing apparatus, an image processing apparatus control method, and a storage medium.

DESCRIPTION OF THE RELATED ART

When a wireless LAN that complies with the IEEE802.11 series of standards (hereinafter called as the wireless LAN) is used, there are many settings to be set before use. Thus, an automatic setting method for easily setting communication parameters in a wireless device is proposed. For example, the association called Wi-Fi Alliance has developed a standard for a method for automatically setting communication parameters termed a Wi-Fi Protected Setup™ (WPS). Japanese Patent Laid-Open No. 2010-41666 discloses a device that provides communication parameters appropriate for a terminal device by identifying a device type of the terminal device in automatic setting protocol processing for the communication parameters by means of the WPS. According to the WPS, communication between a wireless device and the access point is performed so that the communication parameters are automatically set. In the WPS method, a method is proposed in which devices can be wirelessly connected peer-to-peer by incorporating the access point in one of the two devices. This method has been developed as a standard termed Wi-Fi Direct® by Wi-Fi Alliance. Recently, a system is becoming into general use in which a user utilizes an image processing apparatus through an information processing apparatus such as a smart phone or a tablet by connecting the information processing apparatus to the image processing apparatus by means of the Wi-Fi Direct®.

When the Wi-Fi Direct® is used, the information processing apparatus and the image processing apparatus are connected peer-to-peer for utilizing print functions provided in the image processing apparatus through information processing apparatus by a user. However, when functions (such as a search protocol or a printing protocol) that are used by the information processing apparatus for printing are disabled in the image processing apparatus side, a user cannot execute printing even if wireless connection is successful despite the success of the wireless connection.

SUMMARY OF THE INVENTION

The image processing apparatus of the present invention automatically enables settings that an image processing apparatus uses for provision of an image processing service in which image processing is executed upon wireless communication with the information processing apparatus when the settings are not enabled.

The image processing apparatus of the present embodiment is capable of communicating with an information processing apparatus by wireless communication. The image processing apparatus includes a wireless communication unit configured to directly communicate with the information processing apparatus by wireless communication without passing through an access point; a providing unit configured to provide a service in which image processing is executed in response to an image processing request transmitted from the information processing apparatus via the wireless communication unit; and an enabling unit configured to enable a setting in the image processing and that is used for providing the service. When the information processing apparatus establishes communication with the image processing apparatus via the wireless communication unit, the enabling unit enables the setting that is used for providing the service if the setting is not enabled.

According to the image processing apparatus of the present invention, the image processing apparatus can automatically enable settings that an image processing apparatus uses for provision of an image processing service in which image processing is executed upon wireless communication with the information processing apparatus when the settings are not enabled Further features of the present invention will become apparent from the following description of exemplary embodiments with reference to the attached drawings.

BRIEF DESCRIPTION OF THE DRAWINGS

FIG. 6 illustrates an example of a WPS message that an image processing apparatus receives from information processing apparatus.

FIG. 9 illustrates TLV structured data in a vendor extended region of a WPS message.

DESCRIPTION OF THE EMBODIMENTS

Figure 1:
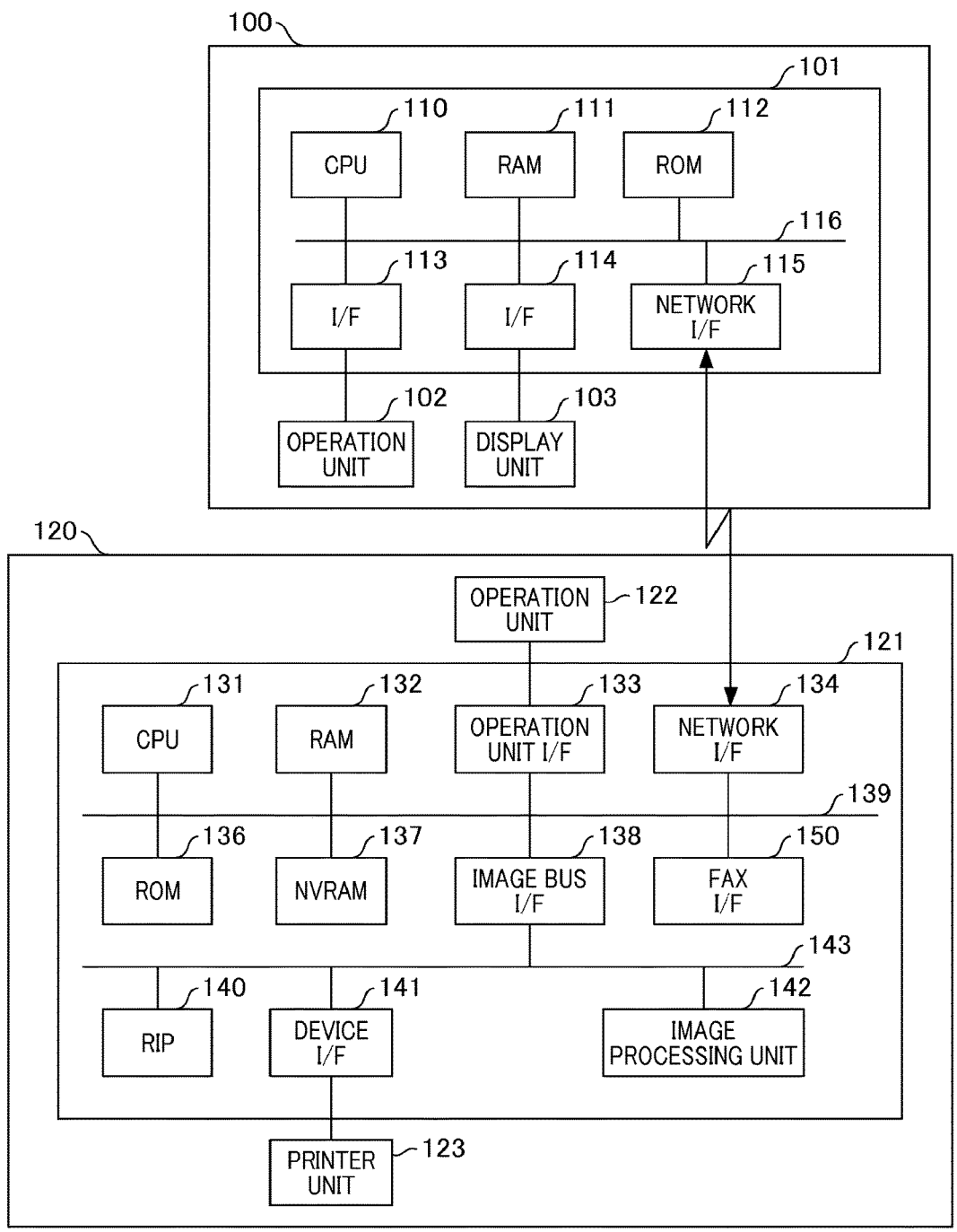
FIG. 1 illustrates exemplary hardware configurations of an information processing apparatus and an image processing apparatus.

FIG. 1 shows exemplary hardware configurations of an information processing apparatus and an image processing apparatus of the present embodiment. The information processing apparatus 100 includes a control unit 101, an operation unit 102, and a display unit 103. The control unit 101 of the information processing apparatus includes a CPU 110, a RAM 111, a ROM 112, an operation unit I/F (an operation unit interface) 113, a display unit I/F (a display unit interface) 114, and a network I/F (a network interface) 115. The respective processing units of the control unit 101 are connected with each other via a system bus 116. The network I/F 115 connects to a network I/F 134 of an image processing apparatus 120 to thereby wirelessly communicate with the image processing apparatus 120. "CPU" is an abbreviation for Central Processing Unit. "RAM" is an abbreviation for Random Access Memory. "ROM" is an abbreviation for Read Only Memory.

The CPU 110 reads out various programs stored in the ROM 112 into the RAM 111, and analyzes them to thereby execute various processes. The ROM 112 stores a control program for controlling operation by the information processing apparatus 100, and the CPU 110 executes the control program to thereby control overall operation by the information processing apparatus 100. Also, the ROM 112 stores a program for connection to the image processing apparatus 120, and the CPU 110 executes the program so that the information processing apparatus 100 connects to the image processing apparatus 120. Also, the ROM 112 stores a program with which the information processing apparatus 100 automatically sets wireless communication parameters, and the CPU 110 executes the program so that the information processing apparatus 100 automatically sets the wireless communication parameters.

The image processing apparatus 120 includes a control unit 121, an operation unit 122, and a printer unit 123. The control unit 121 of the image processing apparatus 120 includes a CPU 131, a RAM 132, a ROM 136, a NVRAM 137, an operation unit I/F 133, a network I/F 134, an image bus I/F 138, and a FAX I/F 150. The respective processing units are connected with each other via a system bus 139. The network I/F 134 connects to the network I/F 115 of the information processing apparatus 100 to thereby wirelessly communicate with the image processing apparatus 120. The FAX I/F 150 transmits data received from the information processing apparatus 100 through the network I/F 134 to an external devices.

The control unit 121 of the image processing apparatus 120 includes a RIP 140, a device I/F 141, an image processing unit 142, and an image bus I/F 138. The respective processing units of the control unit 121 are connected with each other via an image bus 143. The image bus I/F 138 is an interface for connecting the system bus 139 to the image bus 143 that transfers image data at high speed, and operates as a bus bridge that converts a data structure. The image bus 143 is a transmission path for exchanging image data, and is constituted by a PCI bus or an IEEE1 394. The RIP (Raster Image Processor) 140, the device I/F 141, and the image processing unit 142 are connected to the image bus 143. The RIP 140 generates a raster image based on a DL (Display-List) that the CPU 131 converts, and generates print data received from the network I/F 134. The device I/F 141 is an interface that connects the printer unit 123 to the control unit 121, and converts image data by synchronous/asynchronous methods and temporarily retains input/output data with a buffer memory (not shown). The image processing unit 142 performs processing such as color conversion, filter processing, and resolution conversion with respect to image data that is output to the printer unit 123.

Figure 2:
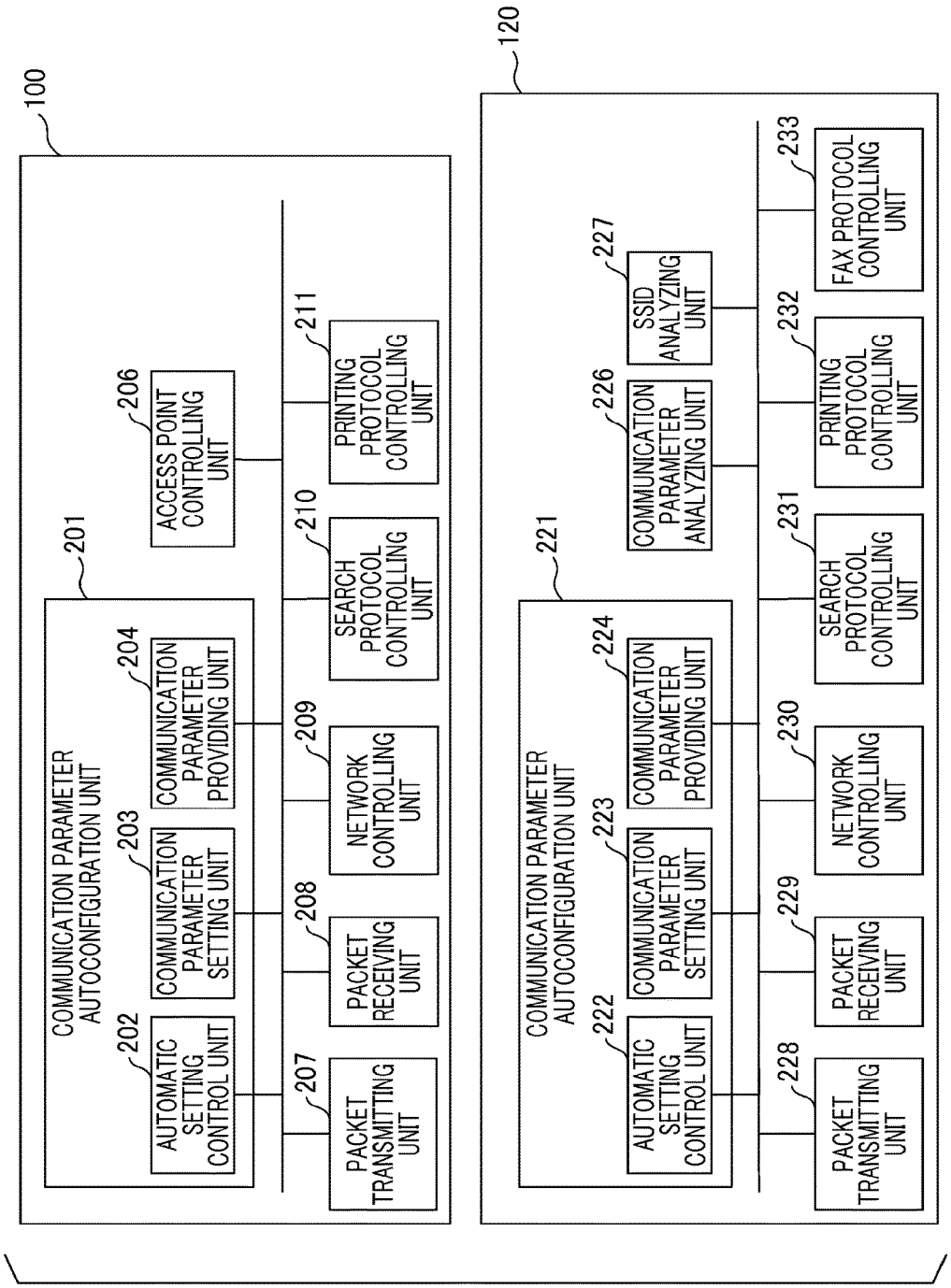
FIG. 2 illustrates an exemplary software configuration of an information processing apparatus and an image processing apparatus.

Next, a description will be given of software function block diagrams of the information processing apparatus and the image processing apparatus of the present embodiment with reference to FIG. 2. The CPU 110 and CPU 131 provided in the information processing apparatus 100 and the image processing apparatus 120 realize the respective functions by executing the respective control programs.

The information processing apparatus 100 includes a communication parameter autoconfiguration unit 201, an access point controlling unit 206, a packet transmitting unit 207, a packet receiving unit 208, a network controlling unit 209, a search protocol controlling unit 210, and a printing protocol controlling unit 211. The communication parameter autoconfiguration unit 201 includes an automatic setting control unit 202, a communication parameter setting unit 203, and a communication parameter providing unit 204.

The communication parameter setting unit 203 performs processing for deciding communication parameters by executing the WPS. The communication parameter setting unit 203 automatically sets communication parameters such as an SSID (Service Set Identifier) that is an identifier of an access point, an encryption method, an encryption key, and an authentication method that are required for wireless LAN communication. Also, the communication parameter setting unit 203 sets extension data about validation for attributes or a print function of the information processing apparatus 100 in the WPS message. In other words, the communication parameter setting unit 203 functions as a setting unit that sets communication parameters for realizing provision of a print service that performs a predetermined print service by the image processing apparatus.

The access point controlling unit 206 controls connections to wireless devices such as the image processing apparatus 120 as an access point. The packet transmitting unit 207 transmits packets concerning various communications. The packet receiving unit 208 receives packets concerning various communications. The network controlling unit 209 controls the connection to the network by wireless communication and the like and disconnection from the network and the like. The printing protocol controlling unit 211 performs a protocol control of an InternetPrintingProtocol (IPP), which is a printing protocol. The IPP is used by the information processing apparatus 100 for transmitting an image to the image processing apparatus 120 when a user selects an image with the information processing apparatus 100 and requests printing. In other words, the printing protocol controlling unit 211 functions as a transmission unit that transmits a printing request. The search protocol controlling unit 210 functions as a search unit, and performs protocol control of a multicastDNS (mDNS), which is a device search protocol. The mDNS is used when the information processing apparatus 100 requests searching for image processing apparatuses that have an IPP function.

The communication parameter autoconfiguration unit 201 controls various protocols in automatic setting processing of the communication parameter. The automatic setting control unit 202 controls the communication parameter setting unit 203 and the communication parameter providing unit 204 to thereby realize the automatic setting processing of communication parameters as described hereinafter. The communication parameter setting unit 203 sets communication parameters that are provided to other devices. The communication parameter providing unit 204 provides the communication parameters set by the communication parameter setting unit 203 to other devices.

The image processing apparatus 120 includes a communication parameter autoconfiguration unit 221, a communication parameter analyzing unit 226, an SSID analyzing unit 227, a packet transmitting unit 228, a packet receiving unit 229, and a network controlling unit 230. Also, the image processing apparatus 120 includes a search protocol controlling unit 231 and a printing protocol controlling unit 232. The communication parameter autoconfiguration unit 221 includes an automatic setting control unit 222, a communication parameter setting unit 223, and a communication parameter providing unit 224.

The automatic setting control unit 222 of the communication parameter autoconfiguration unit 221 controls overall the communication parameter autoconfiguration unit. The automatic setting control unit 222 communicates with the information processing apparatus 100 to thereby automatically set communication parameters. Also, the communication parameter setting unit 223 automatically sets communication parameters such as an SSID that is a network identifier, an encryption method, an encryption key, or authentication method which are required for wireless LAN communication.

The communication parameter analyzing unit 226 performs processing for analyzing the communication parameters set in the WPS message to thereby decide functions that are enabled in the image processing apparatus. The SSID analyzing unit 227 performs processing for analyzing the SSID to thereby decide functions that are enabled in the image processing apparatus. The packet transmitting unit 228 transmits packets related to various communications. The packet receiving unit 229 receives packets related to various communications. The network controlling unit 230 controls connection to the network, disconnection from the network and the like. The search protocol controlling unit 231 performs a protocol control of a multicastDNS (mDNS), which is a device search protocol. The search protocol controlling unit 231 responds to the information processing apparatus 100 upon receipt of a search request for image processing apparatuses that can communicate by wireless communication. The printing protocol controlling unit 232 performs a protocol control of an InternetPrintingProtocol (IPP), which is a printing protocol. The FAX protocol controlling unit 233 performs a facsimile protocol control. The printing protocol controlling unit 232 and the FAX protocol controlling unit 233 control the respective protocols to thereby provide an image processing service for performing image processing selected by a user.

Figure 3:
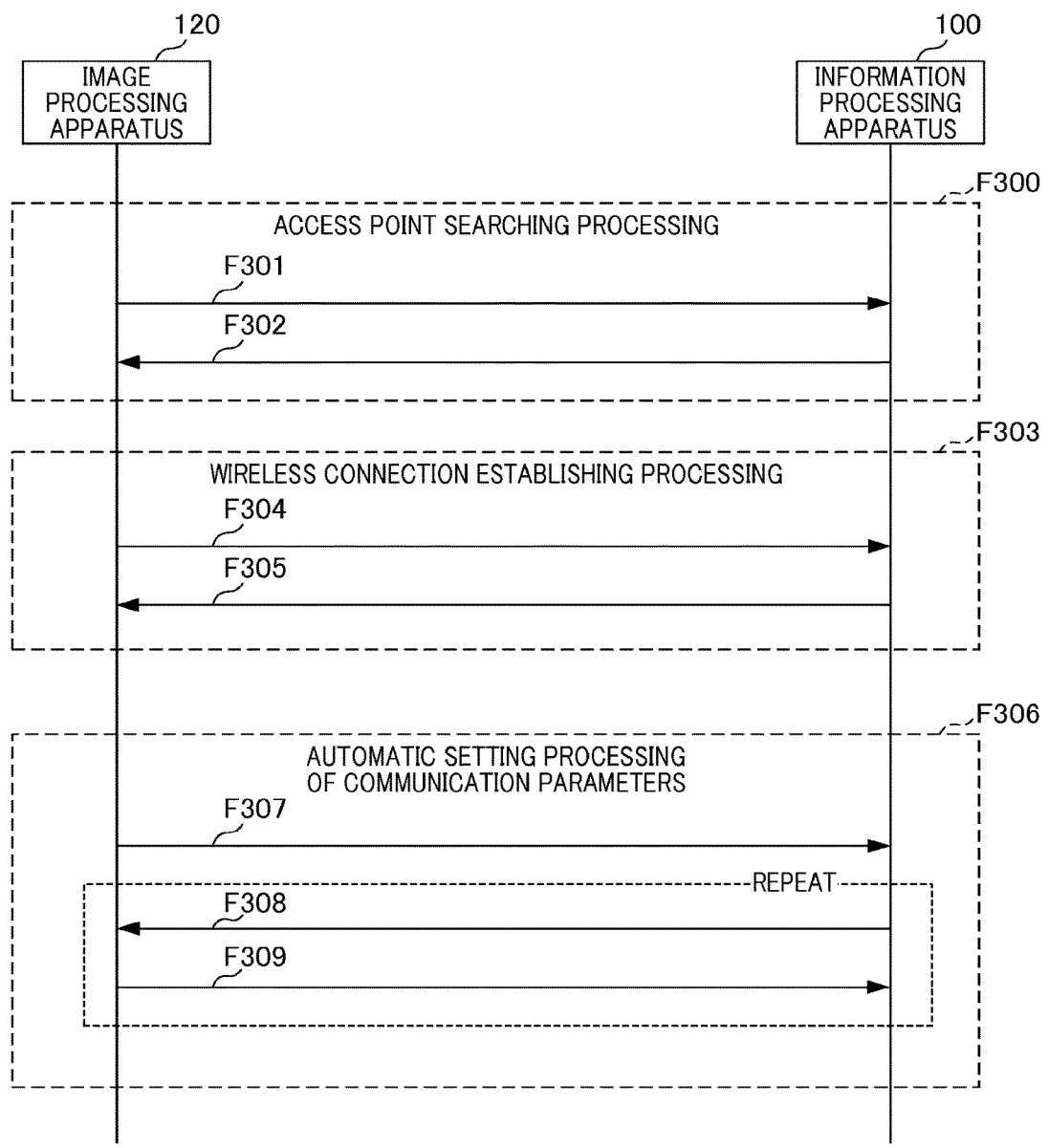
FIG. 3 illustrates processing for searching an information processing apparatus and automatically setting communication parameters.

Next, a description will be given of automatic setting processing of communication parameters by wireless communication in the present embodiment with reference to FIG. 3. FIG. 3 illustrates a sequence diagram between the information processing apparatus 100 and the image processing apparatus 12. This sequence between the information processing apparatus 100 and the image processing apparatus 120 generally consists of access point searching processing (F300), wireless connection establishing processing (F303), and automatic setting processing of communication parameters (F306). The following are descriptions of each process. When instructed to initiate of automatic setting processing of communication parameters, the image processing apparatus 120 searches an access point that can execute the automatic setting processing of communication parameters. Specifically, when a user presses a button and the like and a setting of wireless communication is enabled via the operation unit 122 of the image processing apparatus 120, the automatic setting control unit 222 initiates searching for the access point by broadcast. The image processing apparatus 120 transmits a probe request (F301) for searching for an access point that can execute the automatic setting processing of communication parameters.

When instructed to initiate the automatic setting processing of communication parameters by a user operation, the information processing apparatus 100 similarly places itself in a state in which it awaits accessing the embedded access point. Upon receipt of the probe request (F301), the automatic setting control unit 201 of the information processing apparatus 100 analyzes the probe request. The communication parameter setting unit 203 sets a probe response (F302), in which additional information indicating that the automatic setting processing of communication parameters is executable, is added based on an analysis result by the automatic setting control unit 202. The communication parameter providing unit 204 passes the probe response (F302) via the packet transmitting unit 207 to the image processing apparatus 120. Here, an SSID is included in the probe response passed from the communication parameter providing unit 204. The automatic setting control unit 222 of the image processing apparatus 120 receives and analyzes the probe response (F302) to thereby recognize that the information processing apparatus 100 can execute the automatic setting processing of communication parameters. When the information processing apparatus 100 has not instructed initiating the automatic setting processing of communication parameters, the automatic setting control unit 202 passes the probe response without adding the additional information indicating that the automatic setting processing of communication parameters is executable.

Next, the SSID analyzing unit 227 of the image processing apparatus 120 receives and analyzes the SSID included in the probe response (F302) from the automatic setting control unit 222. When the SSID coincides with a character string stored in a storage device (not shown), the SSID analyzing unit 227 transmits an association request (F304) for performing association so that the automatic setting control unit 222 temporally wirelessly connects to the information processing apparatus 100. The character string is described hereinafter with reference to FIG. 4. Upon receipt of the association request (F304), the automatic setting control unit 202 of the information processing apparatus 100 returns an association response (F305) to thereby complete association. Even if the SSID coincides with the stored character string, normal data communication cannot be achieved at the stage of completion of the association since an encryption key and the like does not coincide.

The automatic setting control unit 222 of the image processing apparatus 120 initiates the automatic setting protocol processing of the communication parameters with the information processing apparatus 100 by using an EAP (Extensible Authentication Protocol) packet. The EAP packet is a packet by which communication between a providing apparatus and a receiving apparatus can be established without cryptographic processing, authentication processing and the like. The automatic setting protocol processing of the communication parameters is initiated when the communication parameter setting unit 223 sets the EAP packet and transmits an initiation message (F307) via the packet transmitting unit 228.

Upon receipt of the initiation message for the automatic setting protocol processing of the communication parameter, the automatic setting control unit 202 transmits an EAP Request packet (F308) to the image processing apparatus 120 to thereby initiate the negotiation of communication parameters. Upon receipt of the EAP Request packet (F308), the automatic setting control unit 202 transmits an EAP Response packet (F309) to the information processing apparatus 100. Transmitting and receiving of the EAP Request packet and the EAP Response packet are repeated so that the automatic setting of the communication parameter can be realized without the access point. In other words, the automatic setting control unit 222 functions as a wireless communication unit that directly and wirelessly communicates with the information processing apparatus without the access point. The automatic setting control unit 202 also functions as a wireless communication unit that directly and wirelessly communicates with the image processing apparatus without the access point. Although a description is given of an embodiment in which the information processing apparatus 100 includes the access point, the image processing apparatus 120 may include the access point. In that case, a search for the access point is initiated from the information processing apparatus 100 side. The automatic setting processing of communication parameters is available from both the information processing apparatus 100 and the image processing apparatus 120.

In the automatic setting processing of communication parameters (F306), encryption processing of a communication path for providing the communication parameter, authentication processing for determining whether or not the communication parameters can be provided, and the like are performed. Hence, various messages for performing the aforementioned processing are transmitted and received between the image processing apparatus 120 and the information processing apparatus 100. Equipment information of the information processing apparatus 100 is included in all or a portion of each message transmitted from the information processing apparatus 100. Such equipment information includes a model name, an OS version, vendor extension data and the like. A model name of the access point (such as AbcSmartPhone) is set in the model name. For example, AbcOS1.0 is set in the OS version. Data defined by a vendor (such as IPP-PRINT=ON, mDNS=ON) is set in the vendor extension data. The details of the vendor extension data are described as hereinafter in the third embodiment. That is, the image processing apparatus 120 can acquire the equipment information of the information processing apparatus 100 by performing the automatic setting processing of communication parameters (F306).

First Embodiment

Figure 4:
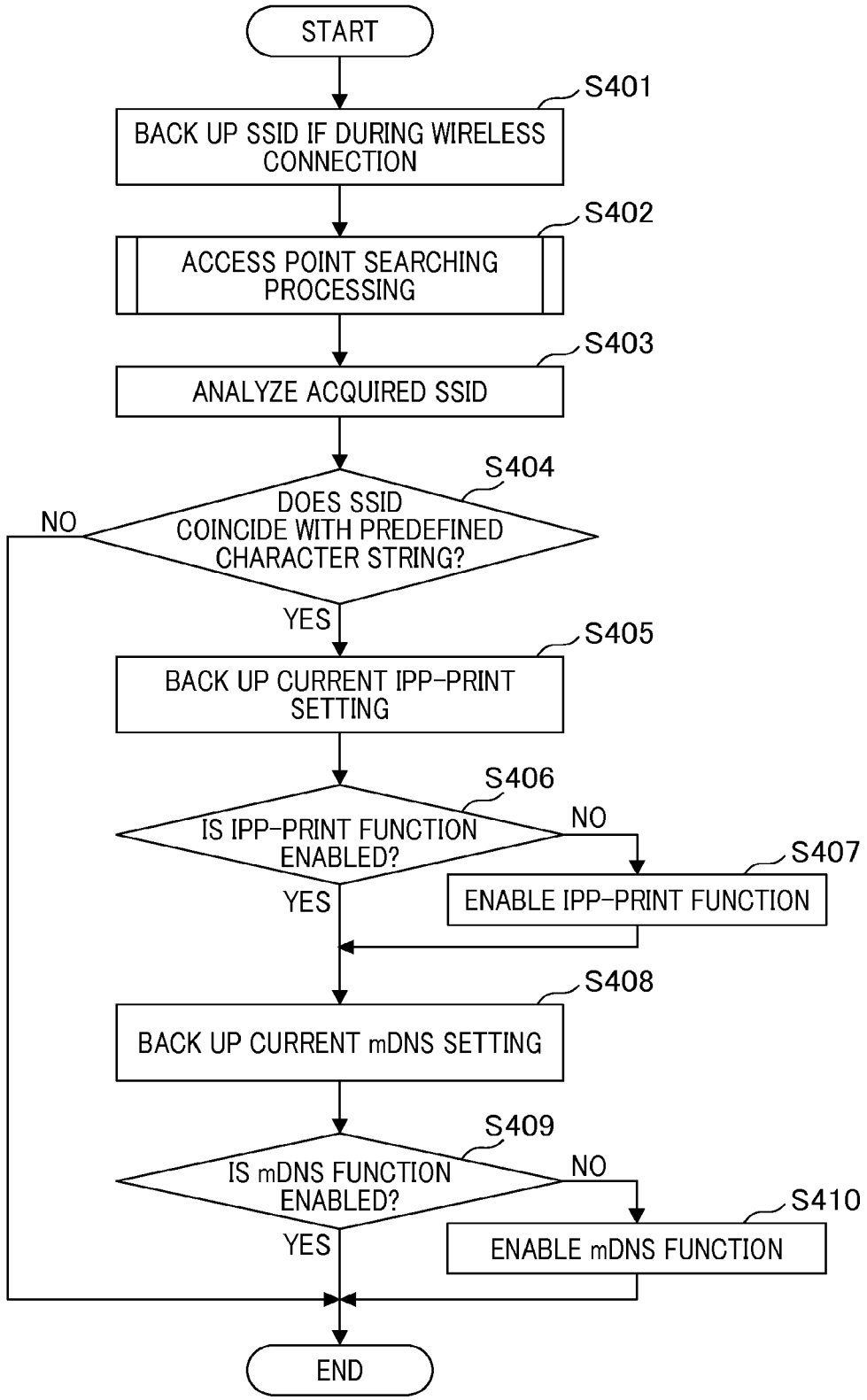
FIG. 4 illustrates processing for enabling a print function using an SSID by an image processing apparatus.

A configuration for enabling predetermined functions by use of the SSID information will be described with reference to FIG. 4. The image processing apparatus 120 and the information processing apparatus 100 in the present embodiment can communicate with each other by wireless communication. With reference to FIG. 4, a description will be given of the processing flow when the image processing apparatus 120 in the present embodiment wirelessly connects to the information processing apparatus 100 by using a Wi-Fi Direct®. The processing flow is executed by the control unit 121 of the image processing apparatus 120.

In S401, when the image processing apparatus 120 is currently wirelessly connected, the automatic setting control unit 222 backs up an SSID currently used for connecting to the NVRAM 137 of the image processing apparatus 120. That is, when the image processing apparatus 120 wirelessly connects to a plurality of user devices via the wireless LAN, it is required for the image processing apparatus 120 to disconnect the wireless connection by the wireless LAN in order to communicate with the information processing apparatus 100 peer-to-peer. Hence, the automatic setting control unit 222 of the image processing apparatus 120 backs up the SSID that is an identifier of the currently wirelessly connected access point to the NVRAM 137. In S402, the automatic setting control unit 222 performs the access point searching processing (F300) described with reference to FIG. 3. The automatic setting control unit 222 acquires, from the information processing apparatus 100, an SSID as identification information for identifying the information processing apparatus by transmitting a probe request. In S403, the SSID analyzing unit 227 compares whether or not the SSID acquired from the automatic setting control unit 222 coincides with a predefined character string (such as AbcSmartPhone_AP) stored in the storage unit. "Predefined character string" denotes a character string indicating an SSID of a specific information processing apparatus. "Specific information processing apparatus" denotes an information processing apparatus that has functions for connecting to the image processing apparatus by means of the Wi-Fi Direct® function, and using the image processing apparatus by means of an IPP-Print function and an mDNS function.

In S404, when the SSID analyzing unit 227 determines that the character string does not coincide with the acquired SSID, the automatic setting control unit 222 terminates processing. In S404, when the SSID analyzing unit 227 determines that the character string coincides with the acquired SSID, the automatic setting control unit 222 backs up the current IPP-Print setting to the NVRAM 137 in S405. In S406, the automatic setting control unit 222 determines whether or not the IPP-Print function is enabled. The enabled state of the IPP-Print function indicates a state in which printing can be executed with the IPP, whereas the disabled state of the IPP-Print function indicates a state in which printing cannot be executed with the IPP. In S407, when the IPP-Print function is disabled, the automatic setting control unit 222 enables the IPP-Print function.

Next, the automatic setting control unit 222 backs up the current mDNS setting to the NVRAM 137 in S408. In S409, the automatic setting control unit 222 determines whether or not an mDNS function is valid. The enabled state of the mDNS function indicates a state in which searching with the mDNS is available, whereas the disabled state of the mDNS function indicates a state in which searching with the mDNS is not available. In S410, the automatic setting control unit 222 enables the mDNS when the mDNS is disabled. In other words, the automatic setting control unit 222 functions as an enabling unit and enables the IPP-Print function and the mDNS function when the IPP-Print function and/or the mDNS function are disabled. Also, the printing protocol controlling unit 232 and the search protocol controlling unit 231 function as a providing unit and provide a predetermined print service in response to the information processing apparatus when the IPP-Print function and the mDNS function are enabled.

It is assumed that the period of validity is preset in enabling processing of the IPP-Print function and the mDNS function. In general, the image processing apparatus having the LAN function is used by a plurality of users through the LAN. Thus, it is desirable to set the period of validity with respect to the period during connection with the specific information processing apparatus peer-to-peer. Any period of validity may be set as the period of validity as long as the image processing apparatus can execute printing after receiving a print request from the specific information processing apparatus.

In the aforementioned processing, the image processing apparatus 120 receives the SSID from the information processing apparatus 100 in the access point searching processing (F300). Then, when the settings such as the IPP-Print function, the mDNS function used for provision of print service or the like is disabled upon wireless connection, the image processing apparatus 120 can automatically enable those settings by using the received SSID.

Next, with reference to FIG. 5, processing when the image processing apparatus 120 disconnects a wireless connection to the information processing apparatus 100 in the present embodiment by use of the Wi-Fi Direct®, and resumes wireless connection to the access point that the image processing apparatus 120 originally has connected will be explained. The processing flow is executed by the control unit 121 of the image processing apparatus 120.

In S501, the automatic setting control unit 222 of the image processing apparatus 120 deactivates wireless communication to the information processing apparatus 100. In S502, the automatic setting control unit 222 reads a backup of the IPP-Print setting from the NVRAM 137. In S503, the automatic setting control unit 222 determines whether or not the read IPP-Print setting is a disable setting. When the read IPP-Print setting is the disable setting, the automatic setting control unit 222 disables the IPP-Print setting in S504. Next, the automatic setting control unit 222 reads a backup of the mDNS setting from the NVRAM 137 in S505. In S506, the automatic setting control unit 222 determines whether or not the read mDNS setting is a disable setting. When the read mDNS setting is the disable setting, the automatic setting control unit 222 disables the mDNS setting in S507. Next, the automatic setting control unit 222 reads a backup of the SSID from the NVRAM 137 in S508. When the backup of the SSID is present, the automatic setting control unit 222 connects to the access point with the backed up SSID in S509. In S510, the automatic setting control unit 222 deletes the backup of the SSID.

In the aforementioned processing, although the IPP-Print setting and the mDNS setting are described as an example, settings to be enabled are not limited thereto. Those skilled in the art can conceive that any settings are enabled as long as the image processing apparatus can provide by wireless communication. Naturally, processing is not limited to processing in which the mDNS setting is enabled after the IPP-Print setting is enabled, and each setting may be enabled in any processing order.

Also, as described above, it is postulated that the image processing apparatus having the LAN function is used by a plurality of users through the LAN. In such environment, the image processing apparatus is managed by connecting to a specific access point that intermediates access to the LAN for connecting to the LAN. In this environment, when the image processing apparatus wirelessly connects to the information processing apparatus 100 by the Wi-Fi Direct®, the plurality of users cannot connect to the LAN since the access point for connection is changed as described with FIG. 4. Hence, when the image processing apparatus 120 deactivates the wireless connection to the information processing apparatus 100 by the Wi-Fi Direct®, it promptly reconnects to the access point to which the image processing apparatus 120 has originally connected in order to connect to the LAN as described with FIG. 5. In this arrangement, a user who has originally used the image processing apparatus through the LAN can continuously uses the image processing apparatus through the LAN.

Figure 5:
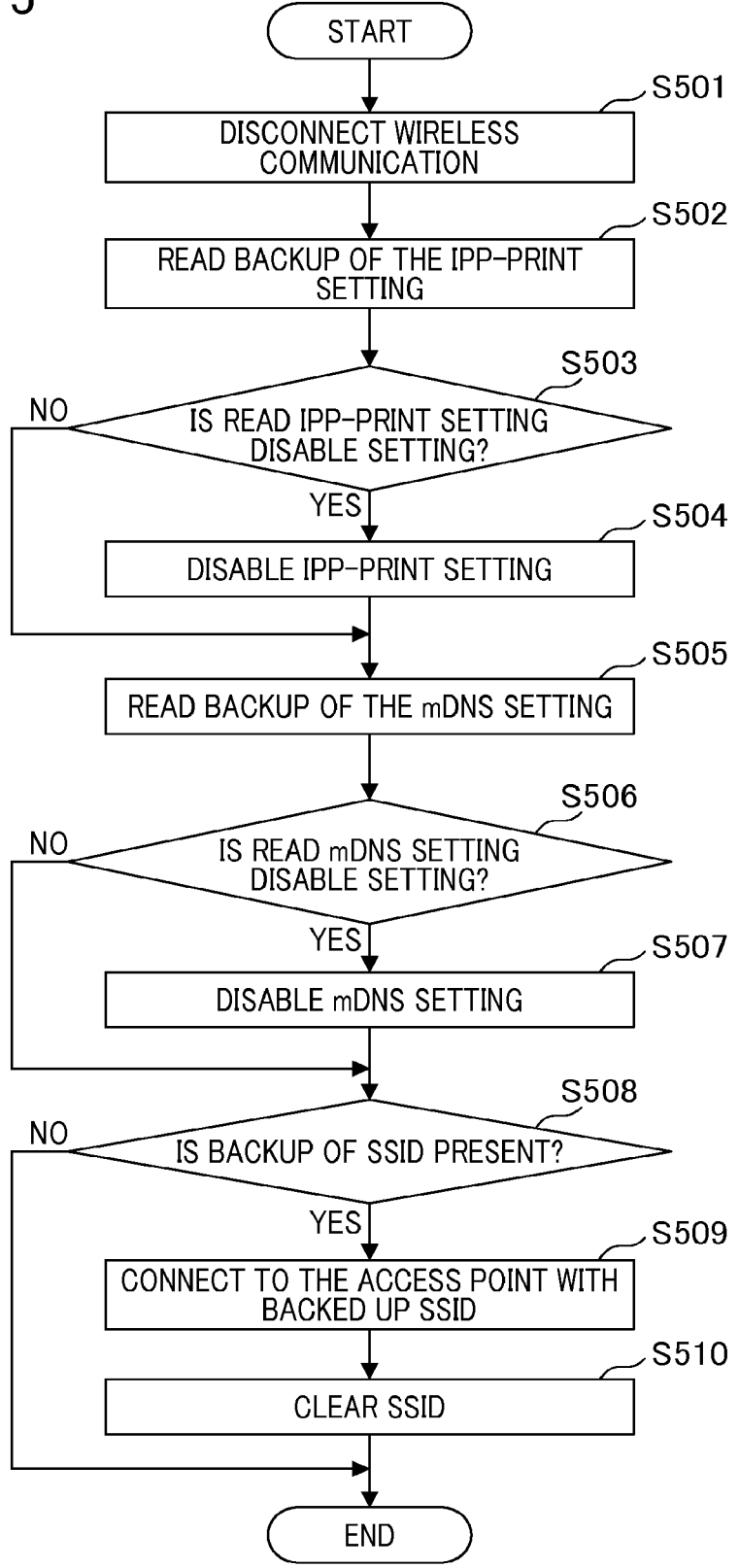
FIG. 5 is processing for disconnecting wireless connection with an information processing apparatus by an image processing apparatus.

With reference to FIG. 4 and FIG. 5, the description of processing was given in which the IPP-Print function and the mDNS function were temporarily enabled for enhancing the convenience. Here, peer-to-peer connection is performed in the Wi-Fi Direct®. Thus, an embodiment can be conceived in which security functions held by the image processing apparatus are disabled during Wi-Fi Direct® connection so that unnecessary security processing is omitted and processing capabilities of the image processing apparatus are improved. For example, an IPsec function, an IP filter function, and an SSL function are conceived as the security functions.

In the first embodiment, when the SSID of the access point which the image processing apparatus 120 accessed coincides with the predetermined value, the image processing apparatus 120 enables the prescribed functions, resulting in enhanced convenience.

Second Embodiment

In the first embodiment, the image processing apparatus uses the SSID in the access point searching processing (F300), and the predetermined functions used in the print service are enabled. In the second embodiment, with reference to FIG. 6 and FIG. 7, a configuration is described in which the predetermined functions are enabled by use of existing data included in a WPS message. In the automatic setting processing of communication parameters (F306) shown in FIG. 3, a plurality of attributes (reference numeral 601 in FIG. 6) in the WAP message transmitted from the communication parameter autoconfiguration unit 201 of the information processing apparatus 100. The following is a description of specific data stored in the respective attributes. Data indicating a message type is stored in "Message Type". A serial number of a wireless apparatus is stored in "Serial Number". A model name of the wireless apparatus is stored in "Model Name". An OS version of the wireless apparatus is stored in "OS Version". In addition to these, various attribute data required for the negotiation of communication parameters are stored.

Figure 7:
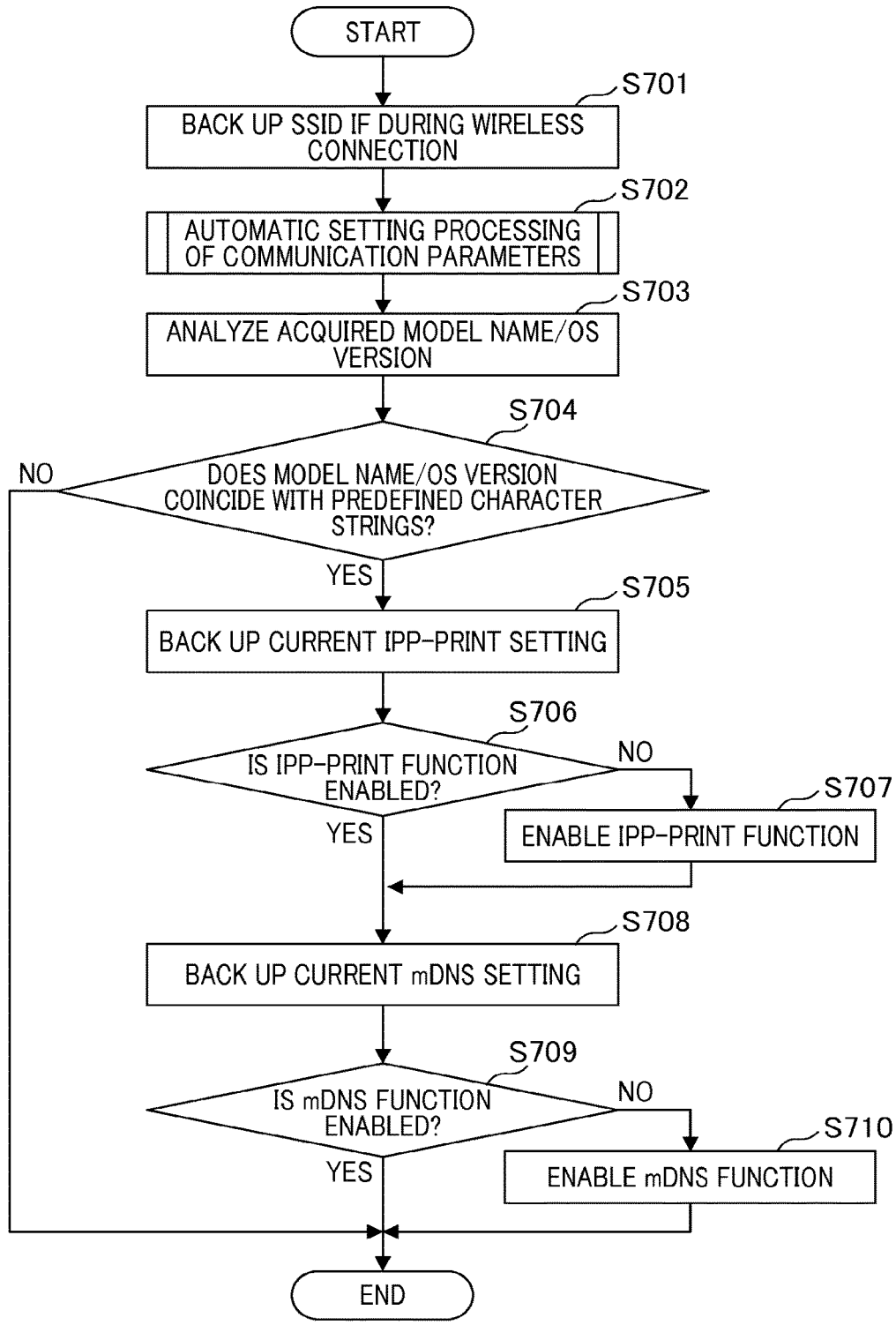
FIG. 7 illustrates processing for enabling a print function using a WPS message by an image processing apparatus.

With reference to FIG. 7, a description will be given of the processing flow when the image processing apparatus 120 in the second embodiment performs wireless connection to the information processing apparatus 100 by using the Wi-Fi Direct®. The processing flow is executed by the control unit 121 of the image processing apparatus 120.

In S701, when the image processing apparatus 120 is already wirelessly connected, the automatic setting control unit 222 of the image processing apparatus 120 backs up the current SSID used for the connection to the NVRAM 137. In S702, the automatic setting control unit 222 performs the automatic setting processing of communication parameters as described with reference to FIG. 3. Specifically, the automatic setting control unit 222 acquires the WPS message set by the communication parameter setting unit 203 of the information processing apparatus 100 in the automatic setting processing of communication parameter (F306) shown in FIG. 3. The "Model Name" and the "OS Version" of the information processing apparatus 100 are included in the WPS message.

In S703, the communication parameter analyzing unit 226 compares whether the Model Name and the OS Version acquired from the automatic setting control unit 222 coincide with predefined character strings stored in the storage unit. "Predefined character strings" denotes character strings indicating the specific information processing apparatus, and examples of such character strings are "AbcSmartPhone", "AbcOS1.0" and the like. "Specific information processing apparatus" denotes an information processing apparatus having functions for connecting to the image processing apparatus by means of the Wi-Fi Direct® function, and using the image processing apparatus by means of the IPP-Print function and the mDNS function.

In S704, when the communication parameter analyzing unit 226 determines that the Model Name and the OS Version do not coincide with the character strings, the automatic setting control unit 222 terminates processing. In S704, when the communication parameter analyzing unit 226 determines that the Model Name and the OS Version coincide with the character strings, the automatic setting control unit 222 backs up the current IPP-Print setting to the NVRAM 137 of the image processing apparatus 120 in S705. In S706, the automatic setting control unit 222 determines whether or not the IPP-Print function is enabled. When the IPP-Print function is disabled, the automatic setting control unit 222 enables the IPP-Print function in S707. Next, in S708, the automatic setting control unit 222 backs up the current mDNS setting to the NVRAM 137 of the image processing apparatus 120. In S709, the automatic setting control unit 222 determines whether or not the mDNS function is enabled. When the mDNS function is disabled, he automatic setting control unit 222 enables the mDNS function in S710. Note that processing flow that is executed when the image processing apparatus 120 in the second embodiment disconnects the wireless connection to the information processing apparatus 100 by using the Wi-Fi Direct® is the same as that described with reference to FIG. 5.

When the existing attributes (the Model Name and the OS Version) included in the WPS message received by the image processing apparatus 120 coincide with the predefined values, the image processing apparatus 120 enables the predetermined functions. Thus, unlike the first embodiment, enabling processing is executed with further accuracy because the image processing apparatus acquires detailed attribute information with respect to the information processing apparatus. In addition, the image processing apparatus can provide functions conforming to individual information processing apparatuses, resulting in enhanced convenience. Although the information processing apparatus can execute print processing by wireless communication based on a combination of the Model Name and the OS Version, the embodiment is not limited thereto. For example, the print processing may be determined based on only the OS Version, or determined based on information other than the aforementioned two attributes.

Third Embodiment

Next, a configuration in which predetermined functions are enabled by use of the WPS message will be described with reference to FIG. 8, FIG. 9, FIG. 10, FIG. 11 and FIG. 12. Note that FIG. 10 and FIG. 11 are for describing operation flows performed on the operation unit 102 of the information processing apparatus 100, and these operation flows are a common configuration in the first, second and third embodiments.

Figure 8:
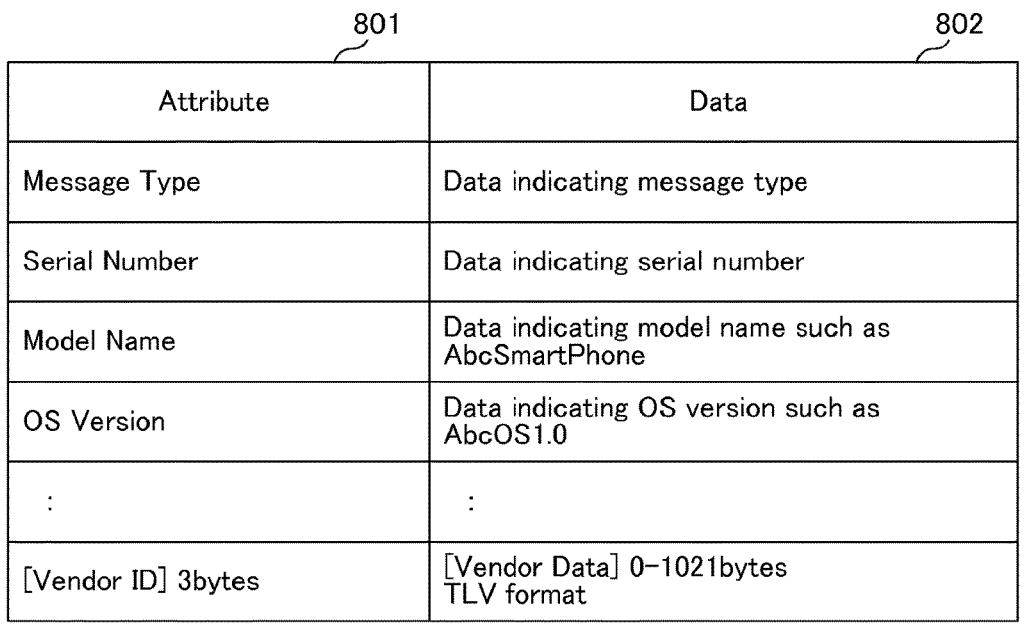
FIG. 8 illustrates an example of an extended WPS message received by an image processing apparatus.

With reference to FIG. 8, a description will be given of vendor extension data included in a WPS message transmitted by the information processing apparatus 100 in the third embodiment. The vendor extension data indicates custom attributes that can be included in the WPS message by a device manufacturer. A user who operates the information processing apparatus 100 can customize attributes by adding information (such as IPP-PRINT=ON and mDNS=ON) to the vendor extension data. FIG. 8 indicates vendor extension data added to the WPS message transmitted by the information processing apparatus 100 in the automatic setting processing of communication parameters (F306) described with reference to FIG. 6. A "vendor ID" (3 bytes) that is provided by the Internet Assigned Numbers Authority (IRNA) is stored in an attribute (801) region of vendor extension data. Data (0-1021 bytes) that consists of a Type-Length-Value (TLV) structure stored in a data (802) region.

With reference to FIG. 9, a description will be given of the TLV-structured data that is set in a vendor extended region and that is described with reference to FIG. 8. Three types of attributes are exemplified in FIG. 9, in which the respective attributes indicate "use of an mDNS", "use of an IPP-Print", and "use of an IPP-Fax". The respective Type codes (902) are defined by "1001", "1002", and "1003". The respective Length codes (903) of attributes are all 1 byte. With respect to the respective Value codes (904) of all attributes, "0x00" indicates "do not use", and "0x01" indicates "use".

Figure 10:
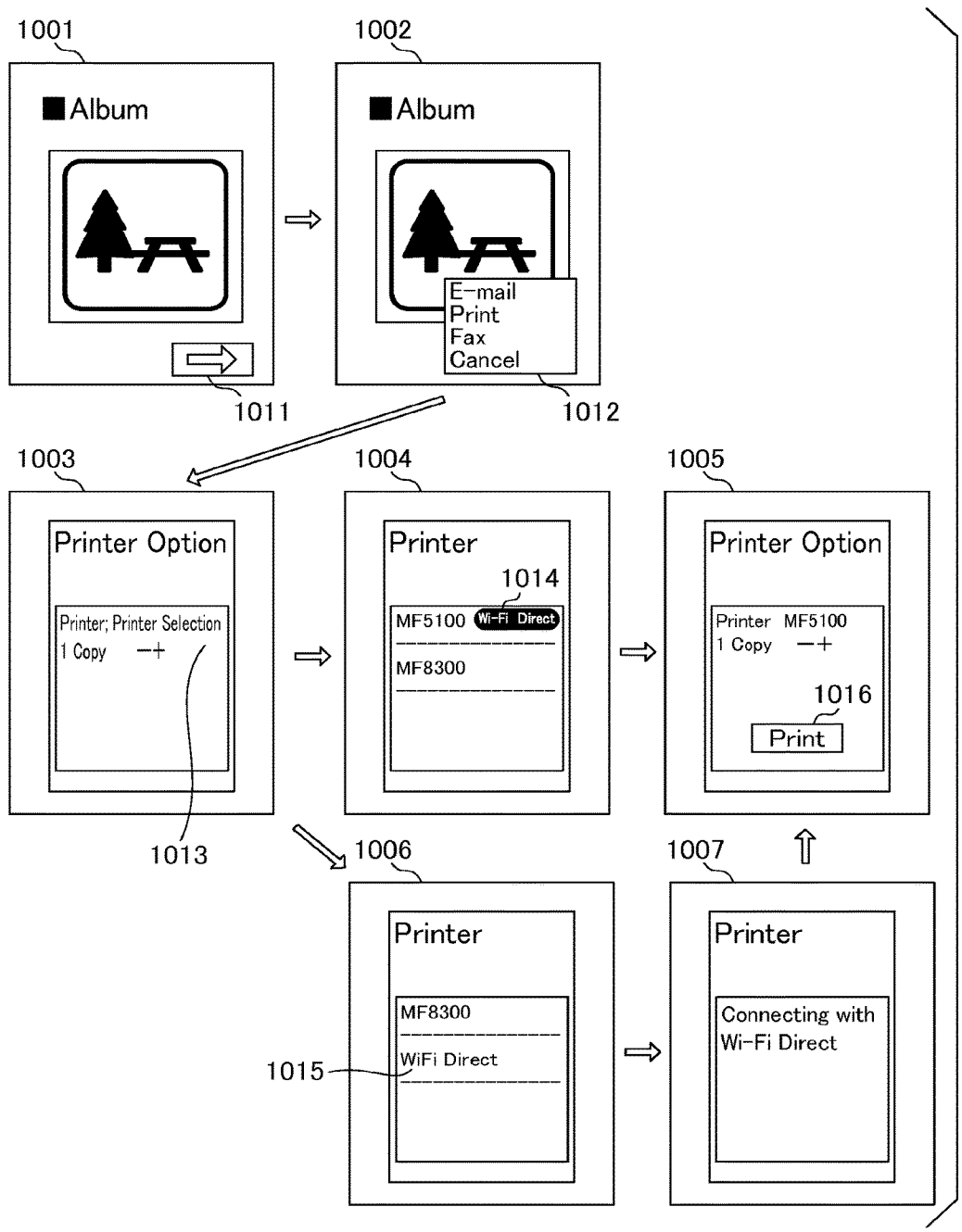
FIG. 10 illustrates a variety of screen examples displayed on a screen of an information processing apparatus upon print request.
Figure 11:
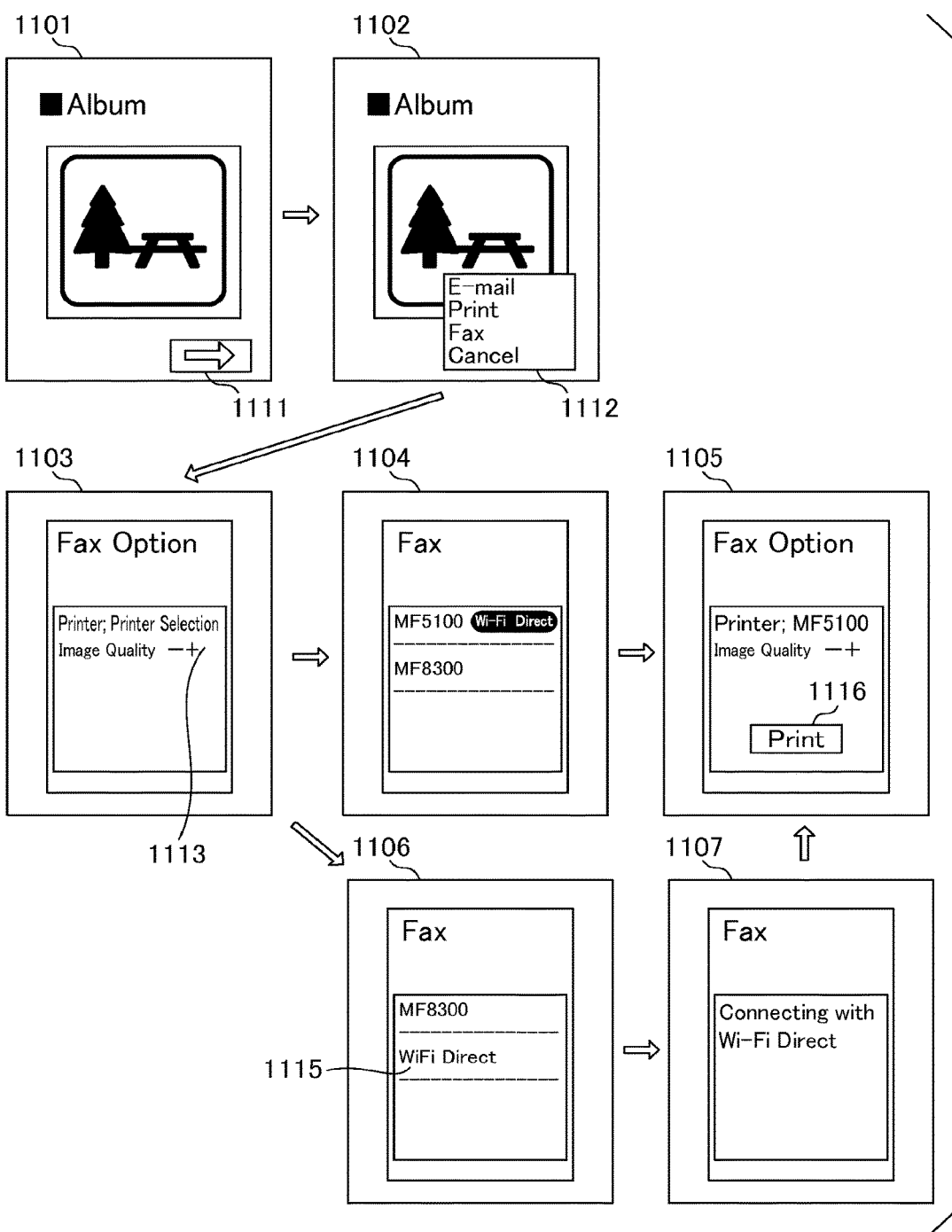
FIG. 11 illustrates a variety of screen examples displayed on a screen of an information processing apparatus upon fax request.

With reference to FIG. 10, a description will be given of operation flow in which a user performs a printing request to the image processing apparatus 120 with the information processing apparatus 100 of the present embodiment. Hereinbelow, the operation unit 102 and the display unit 103 function as a display unit that displays a screen on which a user performs a printing request to the image processing apparatus, and displays the various screens shown in FIG. 10. By a user operation, the display unit 103 of the information processing apparatus 100 displays an image screen 1001 on which an image intended by the user is displayed. A menu key 1011 for operation on the image by the user is arranged on the image display screen 1001. When the user presses the menu key, the operation unit 102 detects the pressing, and the screen transits to a menu selection screen 1002. The user can select an intended operation on the image from among those on the menu 1012. When the user wishes to print the image, a print key is pressed. The screen transits to a printer option screen 1003 upon the pressing of the print key by the user.

The user can set print options including a printer selection, a copy setting and the like on the printer option screen 1003. When the user presses the printer selection key 1013 on the printer option screen 1003, the screen transits to a printer selection screen 1004 in case where the information processing apparatus 100 is already connecting to the image processing apparatus 120 by the Wi-Fi Direct®. In case where the information processing apparatus 100 is not connecting to the image processing apparatus 120, the screen transits to a printer selection screen 1006 on which a Wi-Fi Direct® key 1015 is displayed.

On the printer selection screen 1004, when the information processing apparatus 100 is currently connecting to the image processing apparatus 120 by the Wi-Fi Direct®, the display unit 103 displays the screen 1004 with an icon 1014 for clearly explaining that the information processing apparatus 100 is currently connecting to the image processing apparatus 120 by the Wi-Fi Direct®. In the present embodiment, the image processing apparatus 120 during connection is displayed with its name "MF5100". When the user selects the MF5100, the screen transits to a print screen 1005. A print key 1016 is displayed on the print screen 1005. Upon the pressing of the print key 1016, the information processing apparatus 100 transmits image data to the image processing apparatus 120 for printing.

When the screen transits to the printer selection screen 1006, the display unit 103 also displays a Wi-Fi Direct® key 1015 in addition to the printer name during connection. When Wi-Fi Direct® connection is initiated by pressing of the Wi-Fi Direct® key 1015 by the user, the screen transits to a screen 1007 that indicates Wi-Fi Direct® connection is ongoing. After completion of Wi-Fi Direct® connection, when a connection destination is the image processing apparatus 120, the screen transits to the print screen 1005 on which the image processing apparatus 120 remains selected.

That is, while the icon for clearly explaining that wireless connection is ongoing by the Wi-Fi Direct® is displayed on the printer selection screen, a user can select the printer during Wi-Fi Direct® connection. When the image processing apparatus is not currently connecting to the image processing apparatus by the Wi-Fi Direct®, the user provides instruction for Wi-Fi Direct® connection through the printer selection screen so that the user can select the connected printer. In the aforementioned processing, the automatic setting processing of communication parameters described with reference to FIG. 3 is performed in response to pressing the printer selection key 1013, and the name of the image processing apparatus during connection is displayed on the printer option screen 1003. Alternatively, an icon of the image processing apparatus during connection may be displayed on the printer option screen 1003. Alternatively, the automatic setting processing of communication parameters described with reference to FIG. 3 is performed in response to pressing the Wi-Fi Direct® key 1015 by the user. Alternatively, a configuration may be applied in which the image processing apparatus 120 executes printing in response to selecting an intended image processing apparatus by the user on the printer selection screen 1004 without a display of the print screen 1005.

With reference to FIG. 11, a description will be given of operation flow in which a user performs a fax request with the information processing apparatus 100 in the present embodiment to thereby cause the image processing apparatus 120 to fax. By a user operation, the display unit 103 of the information processing apparatus 100 displays an image display screen 1101 on which an image intended by the user is displayed. A menu key 1111 for operation to the image by the user is arranged on the image display screen 1101. When the user presses the menu key 1111, the screen transits to a menu selection screen 1102. The user can select intended operation from among the menu 1112. When the user wishes to fax, a fax key is pressed. When the fax key is pressed, the screen transits to a fax option screen 1103. The user can set fax options such as a printer selection or an image quality setting on the fax option screen 1103. When the user presses a printer selection key 1113 on the fax option screen 1103, the screen transits to a printer selection screen 1104 if the information processing apparatus 100 is being connected by Wi-Fi Direct®, and otherwise the screen transits to a printer selection screen 1106. On the printer selection screen 1104, when the information processing apparatus 100 is currently connecting to the image processing apparatus 120 by the Wi-Fi Direct®, the display unit 103 displays the printer selection screen 1104 on which an icon 1114 for clearly explaining that the information processing apparatus is currently connecting to the image processing apparatus 120 is added. In the present embodiment, the image processing apparatus 120 is displayed with its name "MF5100". When the user selects the "MF5100", the screen transits to a fax option screen 1105. A fax key 1116 is displayed on the fax option screen 1105. When the fax key 1116 is pressed, the information processing apparatus 100 transmits image data to the image processing apparatus 120 for a fax.

When the screen transits to the printer selection screen 1106, the display unit 103 also displays a Wi-Fi Direct® key 1115 in addition to one or more printers during connection or connectable printers. When Wi-Fi Direct® connection is initiated by pressing the Wi-Fi Direct® key 1115 by the user, the screen transits to a screen 1107 that indicates Wi-Fi Direct® connection is ongoing. After completion of Wi-Fi Direct® connection, when the connection destination is the image processing apparatus 120 the screen transits to the fax option screen 1105 on which the image processing apparatus 120 remains selected.

That is, the user can select the printer already during Wi-Fi Direct connection if available on the printer selection screen. When the information processing is not connecting to the image processing apparatus by the Wi-Fi Direct®, the user instructs Wi-Fi Direct® connection on the fax selection screen so that the user can select the connected printer.

Figure 12:
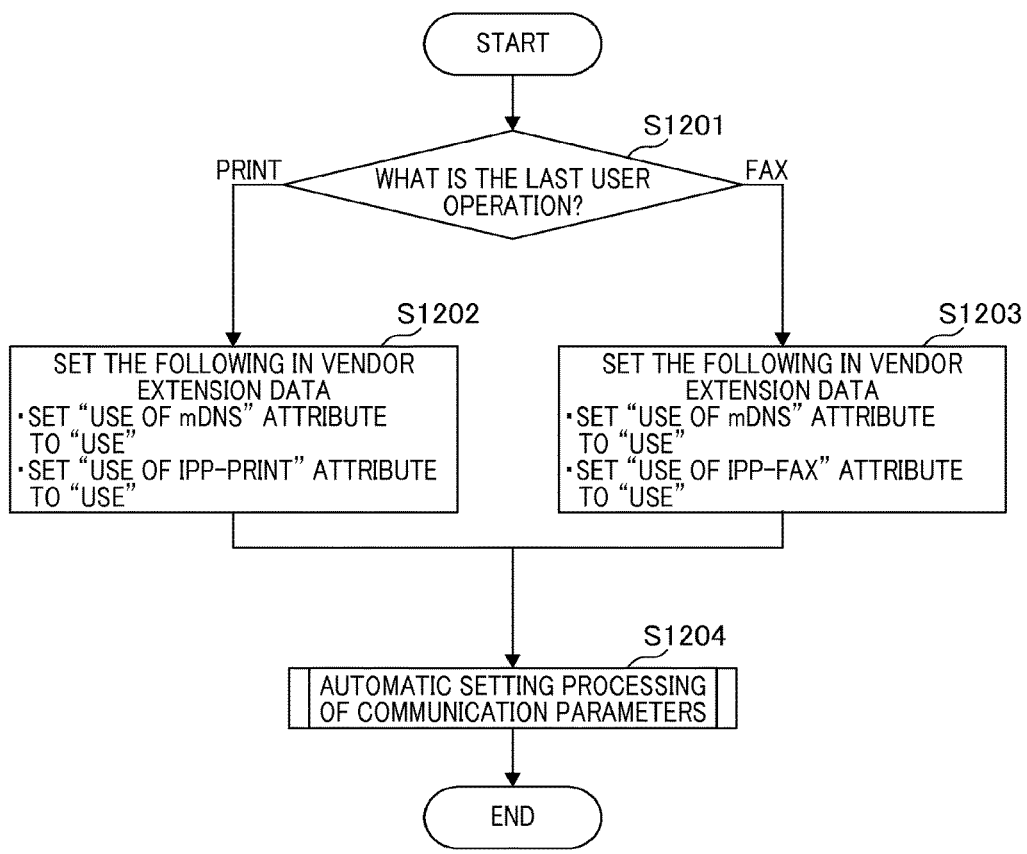
FIG. 12 illustrates exemplary setting processing of TLV structured data by an information processing apparatus.

With reference to FIG. 12, a description will be given of processing flow when the information processing apparatus 100 of the present embodiment performs wireless connection to the image processing apparatus 120 by using Wi-Fi Direct®. The processing flow is executed by the information processing apparatus 100 when the Wi-Fi Direct® key 1015 or 1115 shown in FIG. 10 and FIG. 11 is pressed. In S1201, the automatic setting control unit 202 of the information processing apparatus 100 determines the last user operation. Specifically, the last user operation means an operation selected by the user on the menu selection screen 1012 or 1112 shown in FIG. 10 and FIG. 11. When the user selects a print key, the processing advances to S1202. In S1202, the communication parameter setting unit 203 sets the "use of mDNS" attribute and the "IPP-Print" attribute to "use" in the WPS message described with reference FIG. 8 and FIG. 9. Also, when the user selects a fax key, the processing advances to S1203. In S1203 the communication parameter setting unit 203 sets the "use of mDNS" attribute and the "IPP-Fax" attribute to "use" in the WPS message described with reference FIG. 8 and FIG. 9. Next, in S1204, the WPS message is transmitted to the image processing apparatus and the automatic setting processing of communication parameters by using the WPS message in which vendor extension data is set is performed.

Figure 13:
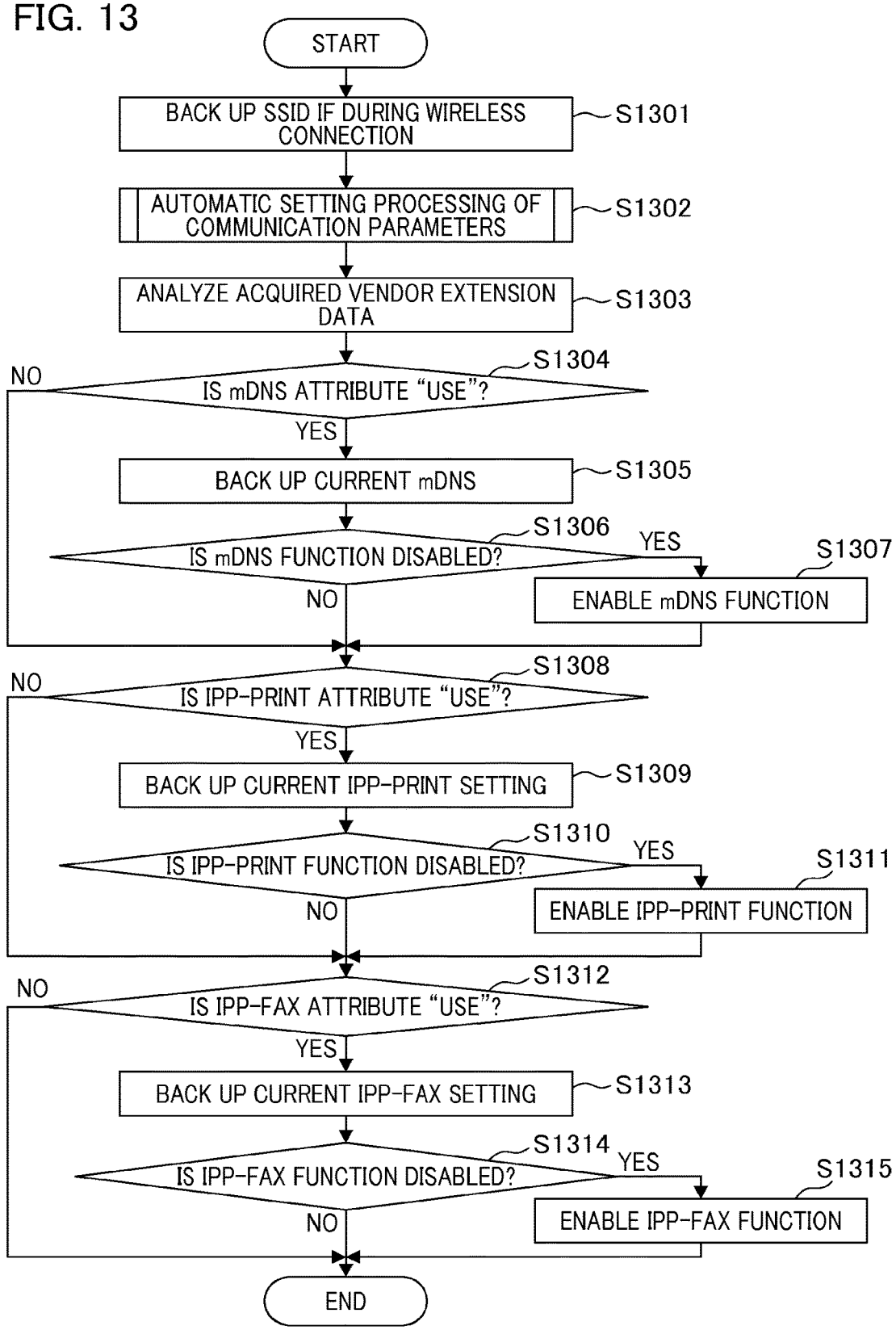
FIG. 13 illustrates processing for enabling a print function using an extended WPS message by an image processing apparatus.

With reference to FIG. 13, a description of processing flow when the image processing apparatus 120 in the present embodiment performs wireless connection to the information processing apparatus 100 by the Wi-Fi Direct®. The processing flow is executed by the control unit 121 of the image processing apparatus 120.

When the image processing apparatus 120 is already performing wireless connection in S1301, the automatic setting control unit 222 backs up currently used SSID for connection to the NVRAM 137 of the image processing apparatus 120. In S1302, the communication parameter autoconfiguration unit 221 performs the automatic setting processing of communication parameters described with reference to FIG. 3. In the automatic setting processing of communication parameter (F306) shown in FIG. 3, the automatic setting control unit 222 acquires vendor extension data included in the WPS message from the automatic setting control unit 202 of the information processing apparatus 100. In S1303, the communication parameter analyzing unit 226 of the image processing apparatus 120 acquires vendor extension data from the automatic setting control unit 222 and analyzes it. The automatic setting control unit 222 acquires each value set in "use of mDNS", "use of IPP-Print" and "use of IPP-Fax" described with reference to FIG. 9 from the communication parameter analyzing unit 226.

When the communication parameter analyzing unit 226 determines that "use" is set in the "mDNS" attribute in S1304, the processing advances to S1305. Otherwise the processing advances to S1308. In S1305, the automatic setting control unit 222 backs up the current mDNS setting to the NVRAM 137 of the image processing apparatus 120. In S1306, the automatic setting control unit 222 determines whether or not the mDNS function is enabled, and enables the mDNS function when it is disabled.

Next, when the communication parameter analyzing unit 226 determines that "use" is set in the "IPP-Print" attribute in S1308, the processing advances to S1309. Otherwise, the processing advances to S1312. In S1309, the automatic setting control unit 222 backs up the current IPP-Print setting to the NVRAM 137 of the image processing apparatus 120. In S1310, the automatic setting control unit 222 determines whether or not the IPP-Print function is enabled, and enables the IPP-Print function when it is disabled.

Next, the communication parameter analyzing unit 226 determines that "use" is set in an "IPP-Fax" attribute in S1312, and the processing advances to S1313. Otherwise, the processing is terminated. In S1313, the automatic setting control unit 222 backs up the current IPP-Fax setting to the NVRAM 137 of the image processing apparatus 120. In S1314, the automatic setting control unit 222 determines whether or not the IPP-Fax function is enabled, and enables the IPP-Fax function when it is disabled.

Processing in which the image processing apparatus 120 of the present embodiment disconnects the wireless connection to the information processing apparatus 100 by the Wi-Fi Direct®, and resumes wireless connection to the originally connected access point is identical to that described with reference to FIG. 5. In the processing flow of the present embodiment, processing for returning the IPP-Fax function to the setting to which the function has been backed up is added to the processing flow described with reference to FIG. 5.

Also, in the present embodiment, the embodiment is described in case where attributes indicating "use of mDNS", "use of IPP-Print", and "use of IPP-Print" are included in vendor extension data. A configuration may be attempted in which the information processing apparatus 100 notifies the image processing apparatus 120 about a "user ID" and a "password" in an IPP authentication as vendor extension data in addition to the attributes. In general, the IPP authentication is performed for each print job. However, a configuration may be attempted in which the image processing apparatus 120 does not perform the IPP authentication on the second and subsequent print jobs when the information processing apparatus 100 has provided notification about the "user ID" and the "password". With the aforementioned configuration, the processing load is reduced, resulting in an enhancement of processing speed.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-150193, filed Jul. 4, 2012, which is incorporated herein by reference in its entirety.

What is claimed is:

1. A printing apparatus comprising:
a wireless communicator;
a printer; and
a controller,
wherein, when the printing apparatus starts a direct wireless communication, which is directly and wirelessly communicating with an information processing apparatus by the wireless communicator without going through a relay apparatus, the controller determines whether or not a setting of a specific protocol for the printing apparatus to provide a printing service to the information processing apparatus is enabled, and
wherein, in accordance with the determination that the setting of the specific protocol is not enabled, the controller changes the setting of the specific protocol from disable to enable.

2. The printing apparatus according to claim 1, wherein the controller changes the setting of the specific protocol back to disable from enable in accordance with a predetermined condition being satisfied.

3. The printing apparatus according to claim 2, wherein the predetermined condition is that wireless connection with the information processing apparatus by the direct wireless communication has been disconnected.

4. The printing apparatus according to claim 3, wherein, in accordance with the disconnection of the wireless communication from the information processing apparatus, the wireless communicator wirelessly reconnects to the relay apparatus which had been wirelessly connected immediately before starting the direct wireless communication.

5. The printing apparatus according to claim 2, wherein, when the printing apparatus starts the direct wireless communication, if it is determined that the setting of the specific protocol is enabled, the setting of the specific protocol is maintained as enabled even if the predetermined condition is satisfied.

6. The printing apparatus according to claim 5, wherein the predetermined condition is that wireless connection with the information processing apparatus by the direct wireless communication has been disconnected.

7. The printing apparatus according to claim 1, wherein the specific protocol is IPP (Internet Printing Protocol).

8. The printing apparatus according to claim 1, wherein the specific protocol is mDNS (multicast Domain Name System).

9. The printing apparatus according to claim 1, wherein the direct wireless communication is wireless communication by Wi-Fi Direct.

10. The printing apparatus according to claim 1, wherein the controller changes the setting of the specific protocol from disable to enable if the information processing apparatus is a predetermined information processing apparatus, and the setting of the specific protocol is maintained as disabled if the information processing apparatus is not the predetermined information processing apparatus.

11. The printing apparatus according to claim 10, wherein whether or not the information processing apparatus is the predetermined information processing apparatus is determined based on SSID (Service Set Identifier), which is transmitted from the information processing apparatus.

12. The printing apparatus according to claim 10, wherein whether or not the information processing apparatus is the predetermined information processing apparatus is determined based on information included in a Wi-Fi Protected Setup (WPS) message, which is transmitted from the information processing apparatus.

13. A method for controlling a printing apparatus comprising:
   determining, when the printing apparatus starts a direct wireless communication, which is directly and wirelessly communicating with an information processing apparatus by a wireless communicator without going through a relay apparatus, whether or not a setting of a specific protocol for the printing apparatus to provide a printing service to the information processing apparatus is enabled; and
   changing the setting of the specific protocol from disable to enable, in accordance with the determination that the setting of the specific protocol is not enabled.

14. A non-transitory storage medium on which is stored a computer program for making a computer execute a method for controlling a printing apparatus, the method comprising:
   determining, when the printing apparatus starts a direct wireless communication, which is directly and wirelessly communicating with an information processing apparatus by a wireless communicator without going through a relay apparatus, whether or not a setting of a specific protocol for the printing apparatus to provide a printing service to the information processing apparatus is enabled; and
   changing the setting of the specific protocol from disable to enable, in accordance with the determination that the setting of the specific protocol is not enabled.

* * * * *